April 12, 1927.
A. ADAMS
1,624,704
PNEUMATIC CORE FOR BLOCK MACHINES
Filed March 15, 1926
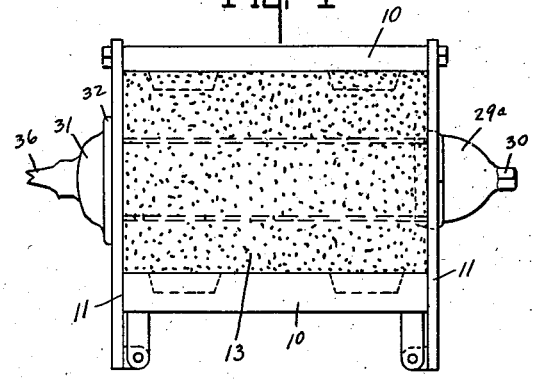
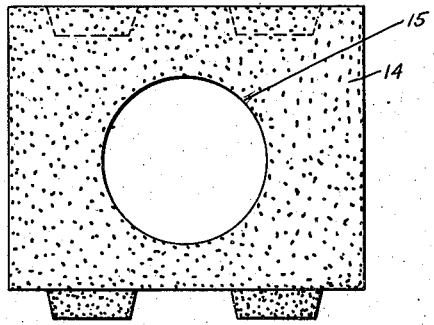
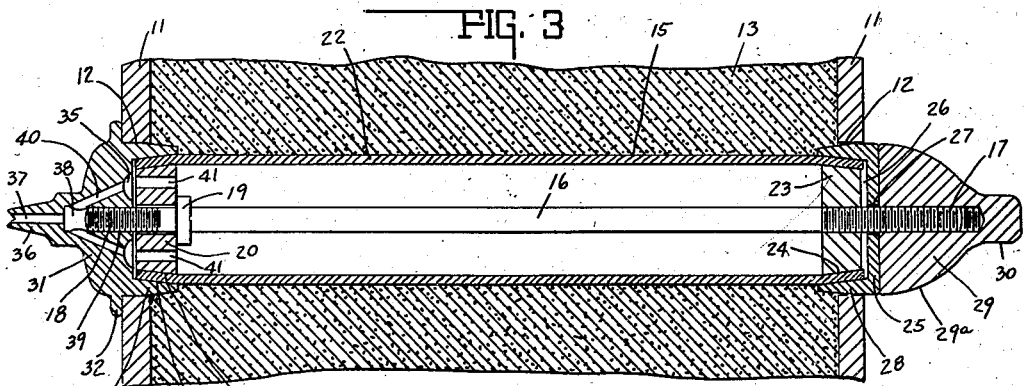
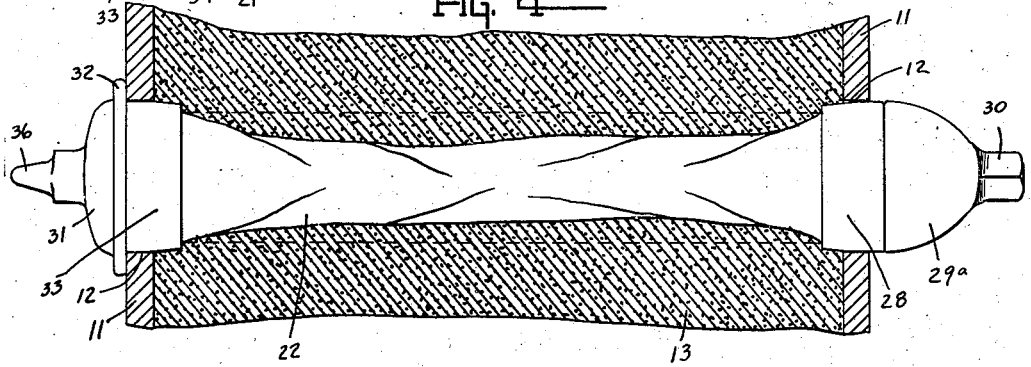
INVENTOR.
ASH ADAMS.
BY
ATTORNEYS.

Patented Apr. 12, 1927.

1,624,704

UNITED STATES PATENT OFFICE.

ASH ADAMS, OF CRAWFORDSVILLE, INDIANA, ASSIGNOR TO LAMORE TILE MACHINE COMPANY, OF CRAWFORDSVILLE, INDIANA, A CORPORATION.

PNEUMATIC CORE FOR BLOCK MACHINES.

Application filed March 15, 1926. Serial No. 94,645.

This invention relates to a pneumatic core device.

The chief object of this invention is to construct a core device of an improved arrangement, whereby the same is adaptable to ready and accurate seating in a mold and ready removal therefrom following the application of pressure to the core for its expansion and following its contraction respectively.

The chief feature of the invention consists in the particular formation of the core and especially the central support and method of mounting the several end parts thereon and the clamping of the ends of the inflatable bag to the end members.

The full nature of the invention will be understood from the accompanying drawings and the following description and claims:

In the drawings Fig. 1 shows one application of the invention in operative relation. Fig. 2 shows a molded block formed with the invention. Fig. 3 is an enlarged central sectional view of the invention applied to pneumatic molding of building block or tile with the pneumatic core in an inflated condition. Fig. 4 is a similar view of the parts shown in Fig. 3 except that the pneumatic core is in deflated condition prior to inflation and the formation of the opening in the block to the desired dimensions.

In the drawings merely by way of illustration of one use of the invention, there is illustrated a mold having opposite sides 10 to which are hinged or otherwise secured, apertured sides 11 having the aperture 12 therein. Moldable material 13 forms the block 14 having the opening 15 therein which corresponds to the inflated condition or outline of the core.

The pneumatic core per se consists of a central rod 16 having threaded ends 17 and 18. Adjacent one threaded end is a stop member 19 and slidably associated on the rod engaging said stop is a truncated cone 20 having the tapered exterior 21. A pressure inflatable bag 22 is of suitable flexible material and is expansible and contractible. Fig. 3 illustrates the bag in its expanded condition, that is, expanded to its normal dimensions in contra-distinction to its arrangement when utilized in molding as shown in Fig. 4, wherein the moldable material is of sufficient weight and density to partially collapse the core. On the threaded end 17 is threaded a truncated cone 23 having the tapered exterior 24. Cones 20 and 23 together with the rod enveloping bag form a closed chamber.

Longitudinally slidable and rotatable as well on the end 17 of the rod 16, is a cap member 25 having a recess 26 and a rod receiving aperture 27. A peripheral flange portion 28 has its wall complementarily formed or tapered so that it can have longitudinal movement and receive the end of the bag 22 and compress or clamp the same to the truncated cone 23. The exterior of this cap is so formed as to be readily receivable by the aperture 12 in the mold box side wall 11. An ornamental nut 29 has its contour suitably formed as at 29ª so that the same is a continuation of and gradual reduction of the exterior of the clamping member or cap 25. This nut also completely encloses the threaded end 17 and the rod 16, and the free end of said nut is suitably formed as at 30 for tool reception, whereby said nut may be easily threaded upon and unthreaded from said stem.

The opposite end of the core includes a combination cap 31, which includes a peripheral flange 32 which bears against the side wall 11 adjacent the opening 12, the cap body portion being receivable in said opening. Said opening receivable portion includes the longitudinally extending peripheral flange 33 which is recessed and has its inner wall 34 complementarily tapered to clampingly receive the end of the inflatable bag 22 and the cone 20. The inner face of the recessed cap includes an annular groove 35. Projecting outwardly from the body portion is a tubular extension 36 having the channel 37 therein. Suitable means connect the same to a source of pressure, preferably air although other mediums of fluid pressure may be employed. The body portion has a central passage 38 which communicates with the passage 37, and said passage 38 is threaded as at 39 to receive the threaded end 18 of the rod 16. A plurality of inclined passages 40 connect through the enlarged passage 37 to the annular groove 40, said groove forming a chamber with which the passages 41 in the truncated cone 20 communicate. Thus pressure can be applied at 37 and inflate the bag from the position shown in Fig. 4 to the position shown in Fig. 3 and maintain said bag in that position until the moldable material has permanently assumed its final form following which the bag may again be deflated if desired.

The invention claimed is:

1. A pneumatic core device comprising a rod threaded at one end, a pressure inflatable bag enveloping said rod, an outwardly tapered member positionable within one end of the bag for supporting the same and mounted on said rod, and a recessed cap having a complementary taper for clampingly receiving the bag end and securing the same between the cap and the supporting member, said cap and said tapered supporting member including communicating passages for supplying pressure to and releasing pressure from said bag.

2. A pneumatic core device comprising a rod threaded at one end, a pressure inflatable bag enveloping said rod, an outwardly tapered member positionable within one end of the bag for supporting the same and mounted on said rod, and a recessed cap having a complementary taper for clampingly receiving the bag end and securing the same between the cap and the supporting member, said cap and said tapered supporting member including communicating passages for supplying pressure to and releasing pressure from said bag, said cap including laterally projecting means for limiting longitudinal movement of the device when mounted for use.

3. A pneumatic core device, comprising a rod threaded at one end, a pressure inflatable bag enveloping said rod, an outwardly tapered member positionable within one end of the bag for supporting the same and mounted on said rod, and a recessed cap having a complementary taper for clampingly receiving the bag end and securing the same between the cap and the supporting member, said cap being slidable on said rod and so formed that the threaded end of the rod projects beyond the cap immediately adjacent thereto, and an ornamental nut threadedly receiving the end of the rod and complementarily enclosing the same, said ornamental nut having a periphery formed as an extension of said cap, and a tool engageable exterior terminal formation for threading said nut upon said rod.

4. A pneumatic core device comprising a rod threaded at both ends, a pressure inflatable bag enveloping said rod, a pair of bag supporting members positionable within and at the ends of the bag and having an outwardly tapered exterior and supported on said rod in spaced relation, a pair of recessed clamping members, the recess being complementarily tapered for receiving the ends of the bag and clamping the same upon the bag supporting members, said clamping members being movable longitudinally of the rod for such clamping engagement, one of said bag supporting members and the adjacent and cooperating clamping member including a communicating passage for supplying pressure to and permitting exhaustion of pressure from said bag.

5. A pressure supplying clamping construction support for a pneumatic core including a rod, an inflatable bag surrounding the same, a bag supporting member supported by said rod within said bag and having an outwardly tapered periphery, and a clamping member recessed to receive the end of the bag and clamp the same to a bag supporting member and threadedly movable upon said rod for securing such clamping engagement, said bag supporting member including a passage therethrough, said clamping member including an annular groove in the recessed portion for registration with the passage of the bag supporting member, and an inclined passage leading from said annular groove to the threaded rod receiving recess for supplying pressure to and releasing pressure from said inflatable bag.

In witness whereof, I have hereunto affixed my signature.

ASH ADAMS.